Sept. 23, 1952     J. R. C. QUILTER     2,611,565
PARACHUTE APPARATUS
Filed Oct. 17, 1951     3 Sheets-Sheet 1
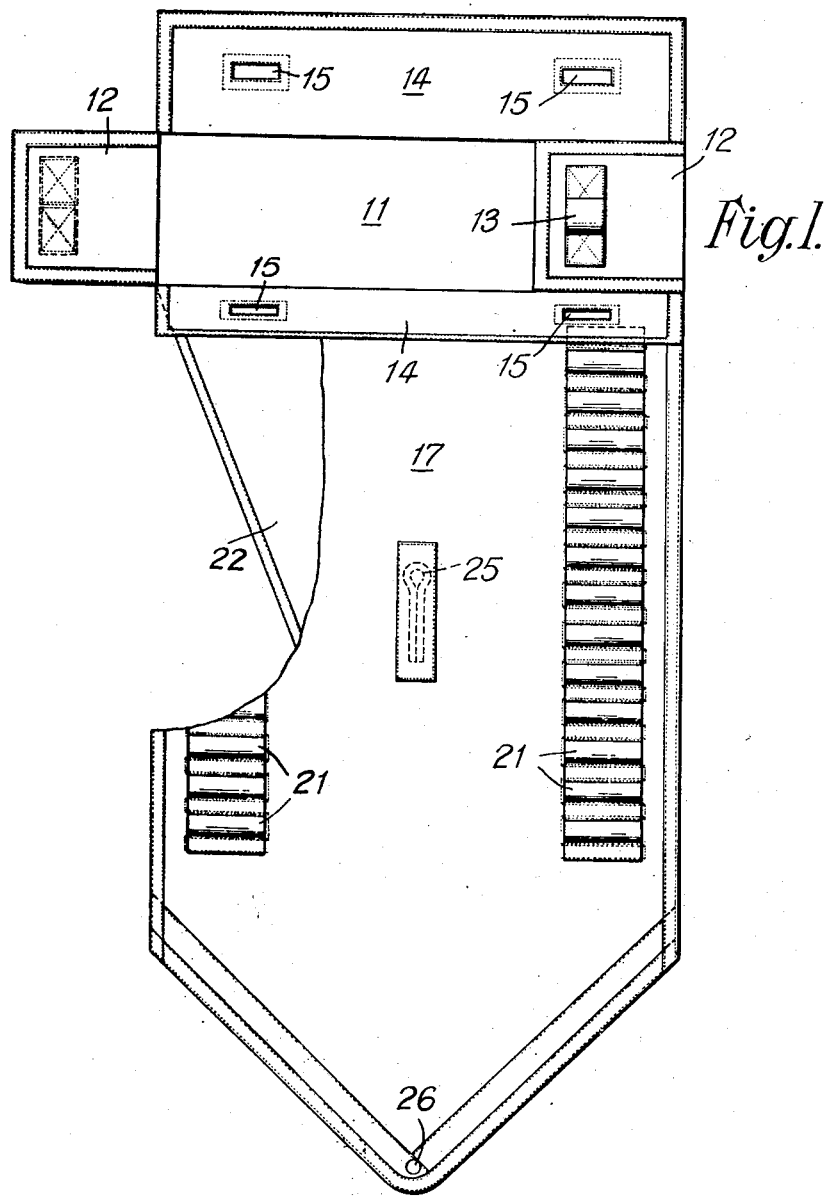
INVENTOR
John R.C. Quilter
By Shoemaker & Mattare
ATTORNEYS Sept. 23, 1952  J. R. C. QUILTER  2,611,565
PARACHUTE APPARATUS
Filed Oct. 17, 1951  3 Sheets-Sheet 2
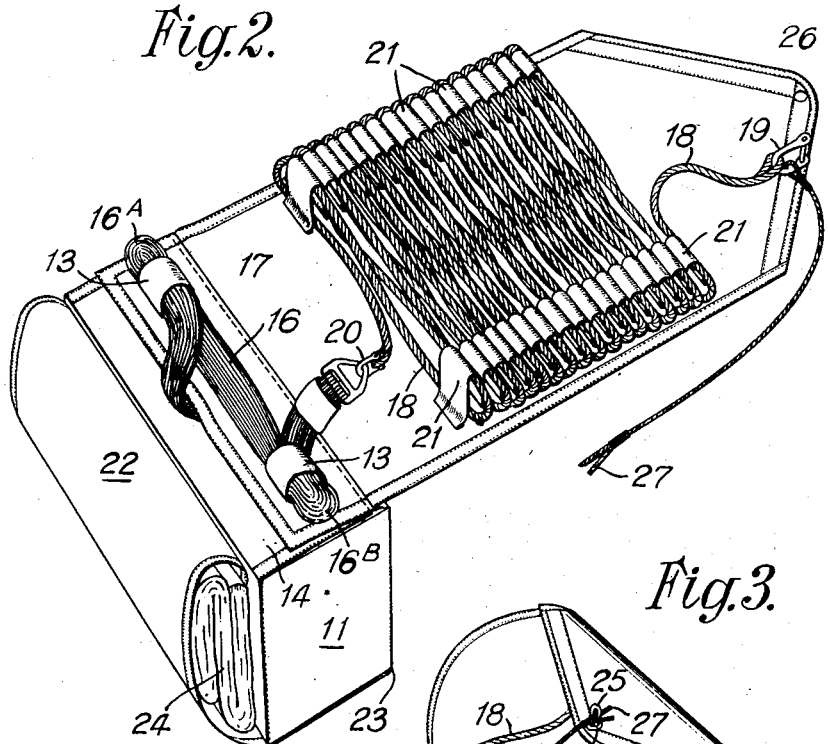
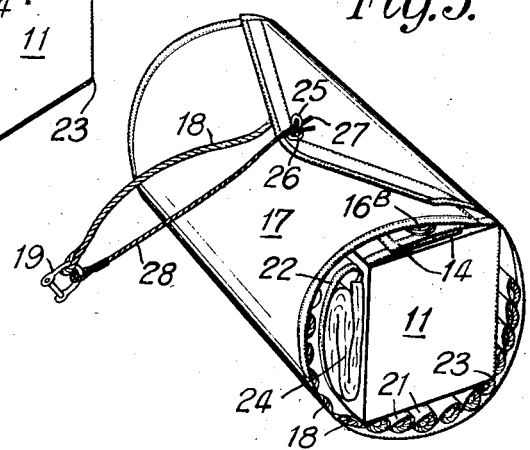
INVENTOR
John R.C. Quilter
By Shoemaker + Mathew
ATTORNEYS Sept. 23, 1952  J. R. C. QUILTER  2,611,565
PARACHUTE APPARATUS
Filed Oct. 17, 1951  3 Sheets-Sheet 3

INVENTOR
John R. C. Quilter
By Shoemaker & Mathew
ATTORNEYS

Patented Sept. 23, 1952

2,611,565

UNITED STATES PATENT OFFICE 2,611,565

PARACHUTE APPARATUS

John Raymond Cuthbert Quilter, Woking, England

Application October 17, 1951, Serial No. 251,721
In Great Britain October 3, 1950

12 Claims. (Cl. 244—113)

This invention relates to parachute apparatus and more particularly to apparatus to be employed for retarding aircraft before landing or at other times according to the judgment of the pilot, for example in order to stop "spin."

The invention has for its main object to provide an improved parachute apparatus suitable for use as a braking or retarding device in connection with modern high-speed aircraft so that they may be landed safely without requiring excessively long runways.

Another object is to provide parachute apparatus for this purpose, which can be stowed in relatively small space and brought into operation when required by ejection from the aircraft through a relatively narrow opening.

A further object of the invention is to provide apparatus for this purpose, which comprises a plurality of parachutes coming into action successively.

Other objects and advantages will appear hereinafter from the following description of a preferred embodiment, given with reference to the accompanying drawings, in which:

Fig. 1 shows a container for the main parachute, provided with a flap having retaining loops for the attachment cable, and with a carrier flap for the pilot parachute or drogue.

Fig. 2 is a perspective view of the container with the main parachute stowed therein, the rigging lines being engaged with the closure flaps so as to form a latching device, and the cable being stowed in its retaining loops, while the pilot parachute is folded and wrapped inside its carrier flap.

Fig. 3 is a similar view of the container with the cable-fitted flap wound around it and locked by a wire connected to the aircraft cable.

Figure 4:
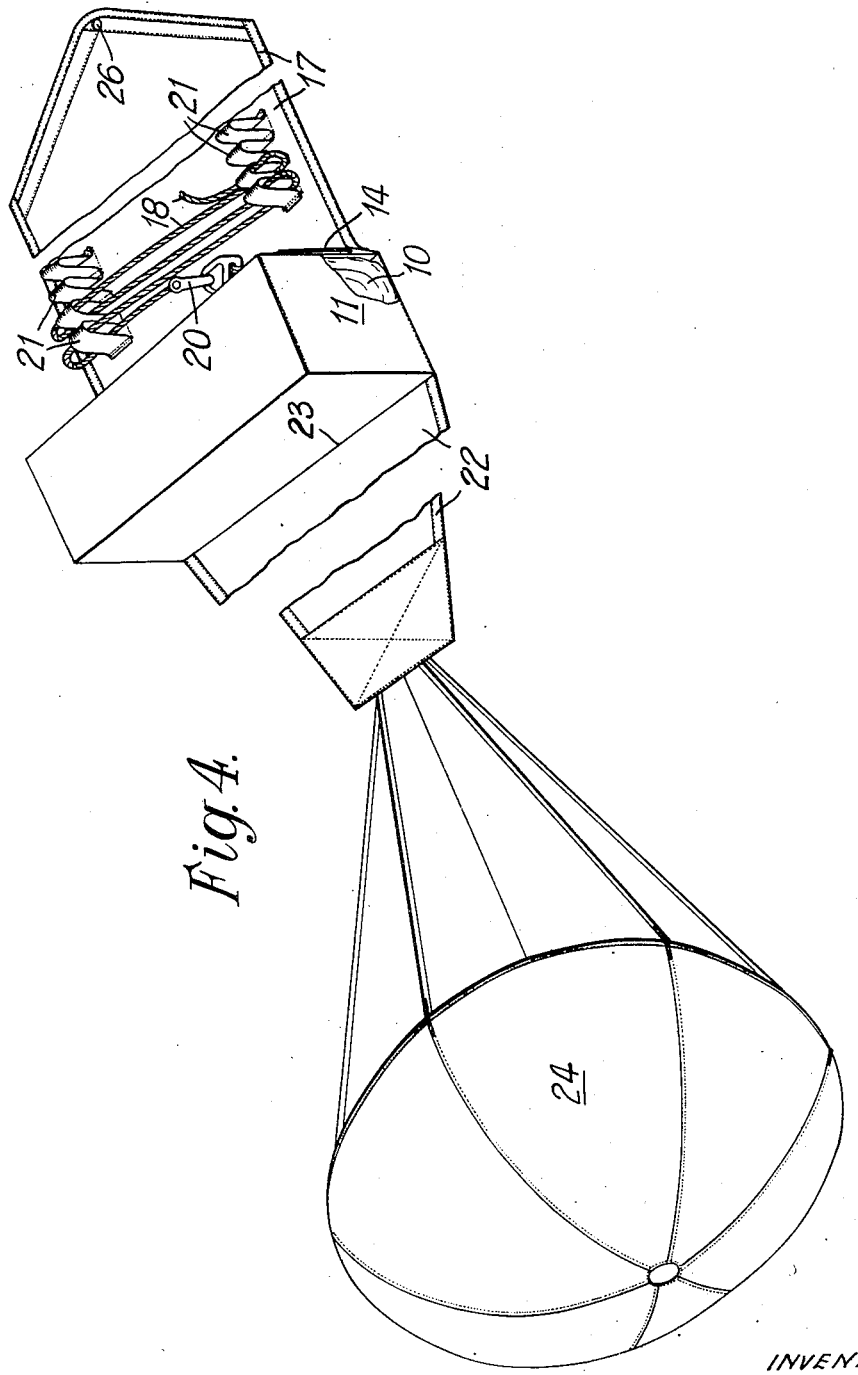
Fig. 4 is a diagrammatic view of the apparatus with the pilot parachute and its carrier extended in one direction and the cable flap extended in the opposite direction, the cable being partly withdrawn from its retaining loops prior to the unlatching of the container and the withdrawal of the main parachute.

In my prior Patent No. 2,396,126, dated March 5, 1946, I have described a parachute pack in which the parachute canopy and shroud lines are stowed in a container which is secured to the aircraft by a flexible member, the canopy having a frangible connection to an anchorage within the container, and the shroud lines being retained upon a flap permanently secured to and normally closing the container. That form of pack was intended for a parachute carried by the aviator and adapted for release by a flexible member or static line secured to the aircraft, the empty container remaining attached thereto while the aviator descended with the parachute.

According to the present invention, the aircraft is provided with a braking apparatus which comprises a parachute stowed in a container together with its rigging lines, means for maintaining the container normally closed, and an intermediate cable secured at one end to the rear of the aircraft and connected at its other end to the rigging lines of the parachute, this cable being detachably mounted upon the container and serving when the latter is thrown from the aircraft, to open the container for extraction of the parachute by continued pull of the cable upon the rigging lines.

In the illustrated embodiment of the invention, the parachute canopy 10 is contained in a bag 11 of approximately rectangular shape, made of suitable textile material; the body of the bag is provided with a pair of end closure flaps 12, having loops 13 on their outer faces, and a pair of side closure flaps 14, formed with slots 15 to fit over the loops 13 in the closed position when the parachute 10 has been stowed, the bag being then latched by means of the rigging lines 16 as seen in Fig. 2. From one of the side flaps 14 there extends another flap 17 in continuation of one of the side faces of the bag, this flap being of sufficient length to wrap around the bag and provide an overlap; this flap serves for the support of a cable 18 which is secured at one end to the rear of the aircraft, as by means of a shackle 19, and is connected at its other end to the rigging lines 16. The portion of the lines emerging from the bag 11 beneath the side closure flaps 14 is doubled to form two bunches 16A and 16B which are inserted into the respective loops 13 above the side flaps 14; the lines are then connected to the intermediate cable 18, as by means of a swivel or shackle 20, so that the lines will be withdrawn from the bag in advance of the parachute canopy.

The cable 18 may be mounted upon the container flap 17 by passing it in zigzag manner under retaining loops 21 arranged towards opposite edges of the flap, in the manner customary for stowing parachute rigging lines in aviator's packs, the loops 21 being on the upper face of the flap, that is, the inner face when the flap is rolled around the bag. In a modification, the retaining loops 21 may be replaced by pockets closed at their outer ends, the loops of cable being inserted into these pockets at the open inner ends.

The bag or container is also provided with a flap 22 of trapezoidal or triangular shape, having a length about half that of the flap 17 and extending from a longitudinal corner 23 of the bag so that it can be wrapped partly around the latter; this flap 22 forms a carrier for a pilot parachute or drogue 24, which is preferably of the vane-fitted type, as seen in Fig. 4, but not necessarily provided with an opening spring. In packing the container, this pilot parachute or drogue will be folded loosely upon the adjacent end of the carrier flap 22 and then placed over the closed and locked flaps 12, 14 and the bunched lines 16, the flap 22 wrapping over the pilot parachute so as to protect it against chafing by the cable 18 when the flap is rolled around the outside.

In the final closed position, as shown in Fig. 3, the flap 17 is rolled up into substantially cylindrical shape and its overlapping end is latched in place by means of a loop 25 stitched upon the outside of the flap and arranged to project through an eyelet 26 at the end of the rolled up flap; the loop 25 is then engaged by a pin 27 upon a final locking wire 28, which is secured to the shackle 19. This final lock is intended for transit purposes only, in order to prevent unrolling of the flaps, but the pin 27 will be released from the loop 25 before the apparatus is installed upon an aircraft; should the pin be left in locking engagement with the loop, it will be withdrawn automatically by the pull of the wire 28, which is made shorter than the length of cable 18 projecting from the packed container.

When the container is thrown from the aircraft, either by hand or mechanically, as by the explosion of a cartridge or the release of a spring ejection device, the pull of the cable 18 will first release the locking pin 27 if still in place, and then cause the flap 17 to unroll and release the carrier flap 22 and pilot parachute 24. Thereupon the cable 18 gradually disengages itself from the retaining loops or pockets upon the opened flap 17, while the pilot parachute acts as a drogue to check the motion of the container; when the cable 18 is wholly released from its flap 17, it pulls upon the rigging lines 16, first withdrawing their bunched portions from the loops 13 so as to unlatch the container, the latter then opening for extraction of the main parachute canopy 10 by the continued pull of the cable 18.

The empty container 11 may remain attached to the main parachute so that the pilot or drogue 24 and the container assist the main parachute in retarding the aircraft, the three pulling in series against it by means of the intermediate cable 18; alternatively, the empty container 11 may be carried off by the pilot parachute so as to be clear of the aircraft in landing, the container being wholly free from the main parachute after the latter has been extracted from it or being connected thereto only by a frangible tie which yields to the pull of the pilot parachute upon the empty container.

In an alternative arrangement, the flap 17 may be dispensed with, the cable 18 being coiled around the bag 11 containing the main parachute and its rigging lines 16 so as to maintain the bag closed; frangible ties or the like may be provided for holding the cable in place during transit. The pilot parachute 24 may have either a flap 22 or an attachment cord similarly coiled around the bag, its end portion adjacent to the parachute being attached to the bag 11 by frangible ties or the like for holding it in place during transit. With this arrangement, the frangible ties will give way as soon as the container is thrown from the aircraft and the opening of the pilot parachute 24 will cause the bag 11 to unroll as it winds off the pilot parachute flap or cord, the cable 18 being payed out at the same time until its whole length has been unwound and the latching device released, the bag being thus left open for the withdrawal of the main parachute and its rigging lines.

It is also possible to employ the main parachute alone, its container 11 being provided with the flap 17 for retaining the cable 18 but without the second flap or drogue carrier 22; in this case, the resistance of the air to the container 11, when thrown from the aircraft, must be sufficient to ensure the unlocking and opening of the container.

In some cases, more than two parachutes may be provided, coming into operation successively; for example the bag or container may itself be arranged to form a parachute intermediate between the pilot parachute and the main parachute, the sizes of the three parachutes being graduated and their deployment controlled so that the larger ones come into action after preliminary retardation of the aircraft by the smaller one or ones. For the same purpose, two or more main parachutes, each with its respective container, may be provided so as to form a chain of retarding parachutes, the deployment of one parachute causing the release of the latching device upon another container.

The improved apparatus not only acts as an aerodynamic brake for retarding the aircraft but also forms an anti-spin device. It will be noted that the flap 17 protects the container and parachutes against accidental damage in handling or in transit, and also against damage when in position upon the aircraft; the combination of the attachment flap 22 and the vane-fitted auxiliary parachute 24 gives protection against the latter becoming fouled with the cable or container.

What I claim is:

1. Parachute apparatus comprising a parachute canopy having rigging lines secured thereto, a cable having one extremity attached to said rigging lines, a container for said canopy, a flap attached to said container, means for retaining said cable in stowed condition upon said flap, said flap with said cable stowed thereon being rollable around said container, and means for locking said flap rolled up around said container with the other extremity of said cable projecting beyond said flap.

2. Parachute apparatus comprising a parachute canopy having rigging lines secured thereto, a cable having one extremity attached to said rigging lines, a container for said canopy, closure means for said container, means for latching said closure means by said rigging lines, a flap attached to said container, means for retaining said cable in stowed condition upon said flap, said flap with said cable stowed thereon being rollable around said container, and means for locking said flap rolled up around said container with the other extremity of said cable projecting beyond said flap.

3. Parachute apparatus comprising a parachute canopy having rigging lines secured thereto, a cable having one extremity attached to said rigging lines, a container for said canopy, a flap attached to said container, means for retaining said cable in stowed condition upon said flap, said flap with said cable stowed thereon being rollable around said container, and means for locking said flap rolled up around said container with the other extremity of said cable projecting beyond said flap, said locking means being released by tension upon the projecting extremity of said cable.

4. Parachute apparatus comprising a parachute canopy having rigging lines secured thereto, a cable having one extremity attached to said rigging lines, a container for said canopy, closure means for said container, means for latching said closure means by said rigging lines, a flap attached to said container, means for retaining said cable in stowed condition upon said flap, said flap with said cable stowed thereon being rollable around said container, and means for locking said flap rolled up around said container with the other extremity of said cable projecting beyond said flap, said locking means being released by tension upon the projecting extremity of said cable.

5. Parachute apparatus comprising a parachute canopy having rigging lines secured thereto, a cable having one extremity attached to said rigging lines, a container for said canopy, closure means for said container, means for latching said closure means by said rigging lines, a flap attached to said container, means for retaining said cable in stowed condition upon said flap, said flap with said cable stowed thereon being rollable around said container, and means for locking said flap rolled up around said container with the other extremity of said cable projecting beyond said flap, said locking means being released by tension upon the projecting extremity of said cable, and said latching means being released by tension exerted upon said rigging lines by said cable after withdrawal of said cable from said retaining means.

6. Parachute apparatus comprising a parachute canopy having rigging lines secured thereto, a cable having one extremity attached to said rigging lines, a container for said canopy, a flap attached to said container, means for retaining said cable in stowed condition upon said flap, a second flap attached to said container, a pilot parachute secured to the free extremity of said second flap, said second flap with said pilot parachute folded thereon being rollable partly around said container, the first-mentioned flap with said cable stowed thereon being rollable around said container externally of said second flap, and means for locking said flaps rolled up around said container with the other extremity of said cable projecting beyond said flaps.

7. Parachute apparatus comprising a main parachute canopy having rigging lines secured thereto, a cable having one extremity attached to said rigging lines, a rectangular container for said main parachute canopy, said container including closure flaps, means for latching said closure flaps by said rigging lines, two flaps secured along parallel lines upon said container, means for retaining said cable in stowed condition upon one of said two flaps, a pilot parachute secured to the free extremity of the other of said two flaps, said other flap with said pilot parachute folded thereon being rollable partly around said container, said one flap with said cable stowed thereon being rollable around said container externally of said folded pilot parachute and said other flap, and means for maintaining said two flaps rolled up around said container.

8. Parachute apparatus comprising a rectangular container made of flexible material and including overlapping flaps for closing one side, two flaps of different lengths secured along parallel lines upon said container, the longer of said two flaps having looped tapes extending along its opposite sides, a pilot parachute secured to the free extremity of the shorter of said two flaps, a cable stowed in the looped tapes upon the longer of said two flaps, a main parachute canopy stowed in said container, means for retaining said overlapping flaps closed over the stowed main parachute canopy with its rigging lines projecting outside said container, the projecting rigging lines latching said retaining means, one extremity of said cable being attached to said projecting rigging lines, and said two flaps with said pilot parachute folded upon said shorter flap and said cable stowed in the looped tapes upon said longer flap being rolled around said container with said longer flap outside said shorter flap.

9. Parachute apparatus comprising a main parachute canopy having rigging lines secured thereto, a cable having one extremity attached to said rigging lines, a rectangular container for said main parachute canopy, said container including closure flaps, means for latching said closure flaps by said rigging lines, two flaps secured along parallel lines upon said container, means for retaining said cable in stowed condition upon one of said two flaps, the other of said flaps being of trapezoidal shape tapering from a wide end secured to said container to a relatively narrow width at its free extremity, a pilot parachute secured to the free extremity of said other flap, said other flap with said pilot parachute folded thereon being rollable partly around said container, said one flap with said cable stowed thereon being rollable around said container externally of said folded pilot parachute and said other flap, and means for maintaining said two flaps rolled up around said container.

10. Parachute apparatus comprising a rectangular container made of flexible material and including overlapping flaps for closing one side, two flaps of different lengths secured along parallel lines upon said container, the longer of said two flaps having looped tapes extending along its opposite sides, a pilot parachute secured to the free extremity of the shorter of said two flaps, a cable stowed in the looped tapes upon the longer of said two flaps, a main parachute canopy stowed in said container, means for retaining said overlapping flaps closed over the stowed main parachute canopy with its rigging lines projecting outside said container, the projecting rigging lines latching said retaining means, one extremity of said cable being attached to said projecting rigging lines, and said two flaps with said pilot parachute folded upon said shorter flap and said cable stowed in the looped tapes upon said longer flap being rolled around said container with said longer flap outside said shorter flap, and said parallel lines being spaced apart by a side of said container adjacent to said one side, whereby the successive unrolling of said flaps from around said container exposes said one side for withdrawal of said main parachute canopy by tension of said cable and rigging lines.

11. Brake apparatus for retarding aircraft, comprising a parachute canopy, rigging lines secured to said canopy, a container for said canopy, a flexible cable secured at one end to said rigging lines, and means connected to the other end of said cable for attachment to an aircraft, said cable being so mounted on said container as to maintain it normally closed but adapted to open said container when subjected to tension.

12. Brake apparatus for use in landing aircraft, comprising a parachute of material sufficiently strong to withstand the high stresses imposed upon it in use and including rigging lines, a parachute pack within which said parachute is housed, a protective flap attached at one end to said pack and adapted to fold around said pack, at least one cable provided at one end with means for anchorage to said aircraft and at the other end connected to said rigging lines, and a plurality of guides mounted on the inner face of said flap for normally retaining said cable thereon and adjacent to said container.

JOHN RAYMOND CUTHBERT QUILTER.

REFERENCES CITED

The following references are of record in the file of this patent:

UNITED STATES PATENTS

| Number | Name | Date |
| --- | --- | --- |
| 2,102,541 | Lundholm | Dec. 14, 1937 |
| 2,389,578 | Quilter | Nov. 20, 1945 |
| 2,508,754 | Frieder | May 23, 1950 |